July 7, 1931. R. S. BROWN 1,813,480
THREADING DEVICE
Filed Sept. 22, 1926 4 Sheets-Sheet 1
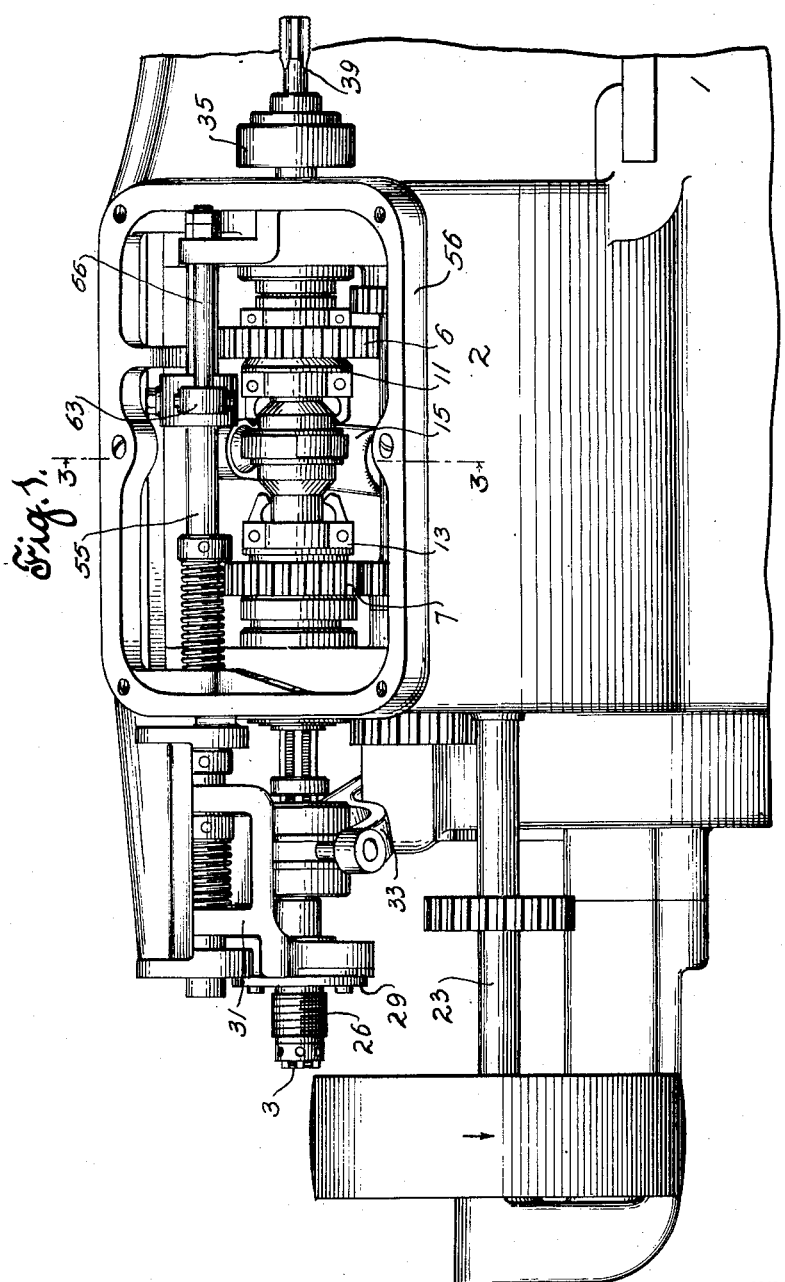
INVENTOR
Robert S. Brown
BY
Mitchell Bechtel
ATTORNEYS July 7, 1931. R. S. BROWN 1,813,480
THREADING DEVICE
Filed Sept. 22, 1926 4 Sheets-Sheet 2
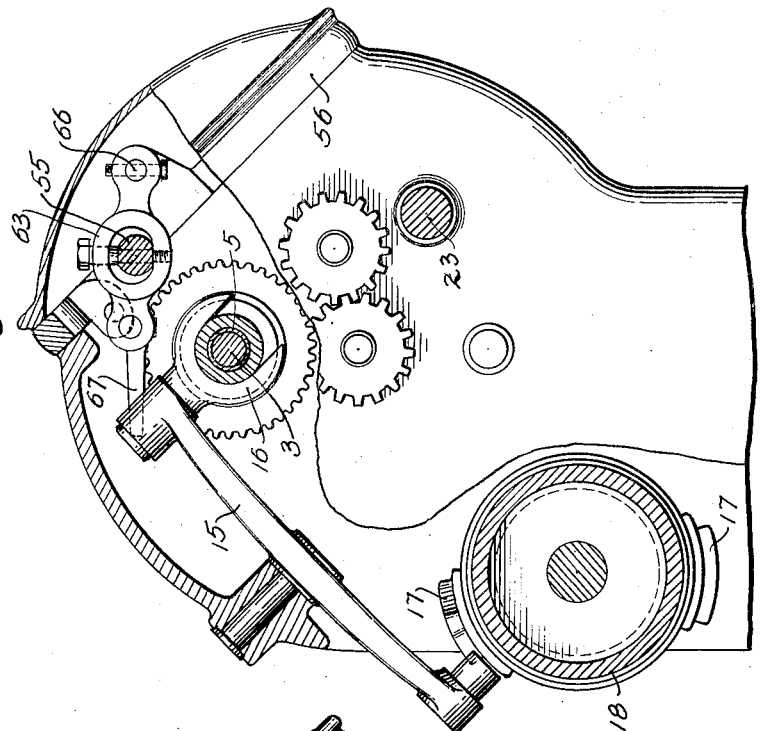
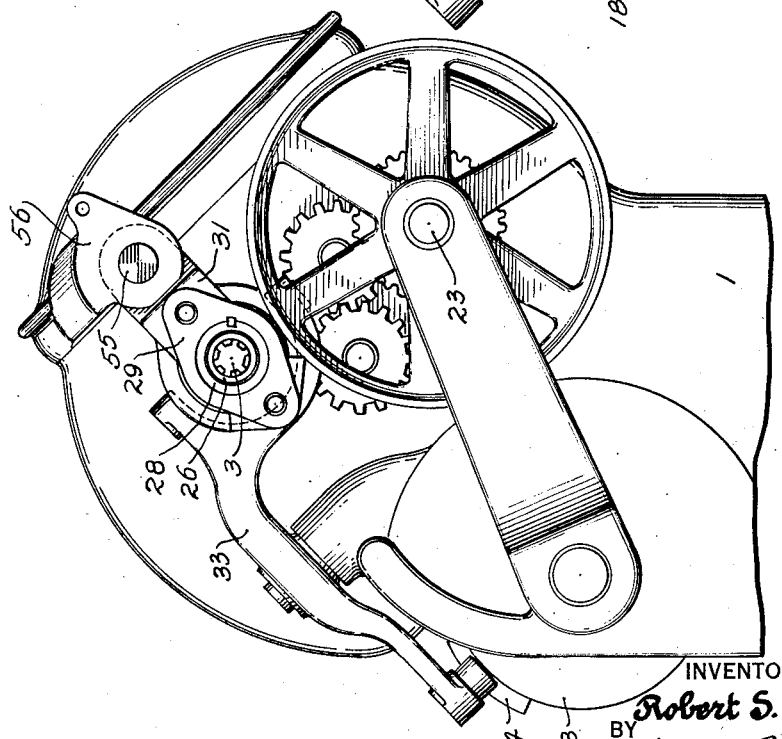
INVENTOR
Robert S. Brown
BY
Mitchell Bechert
ATTORNEYS

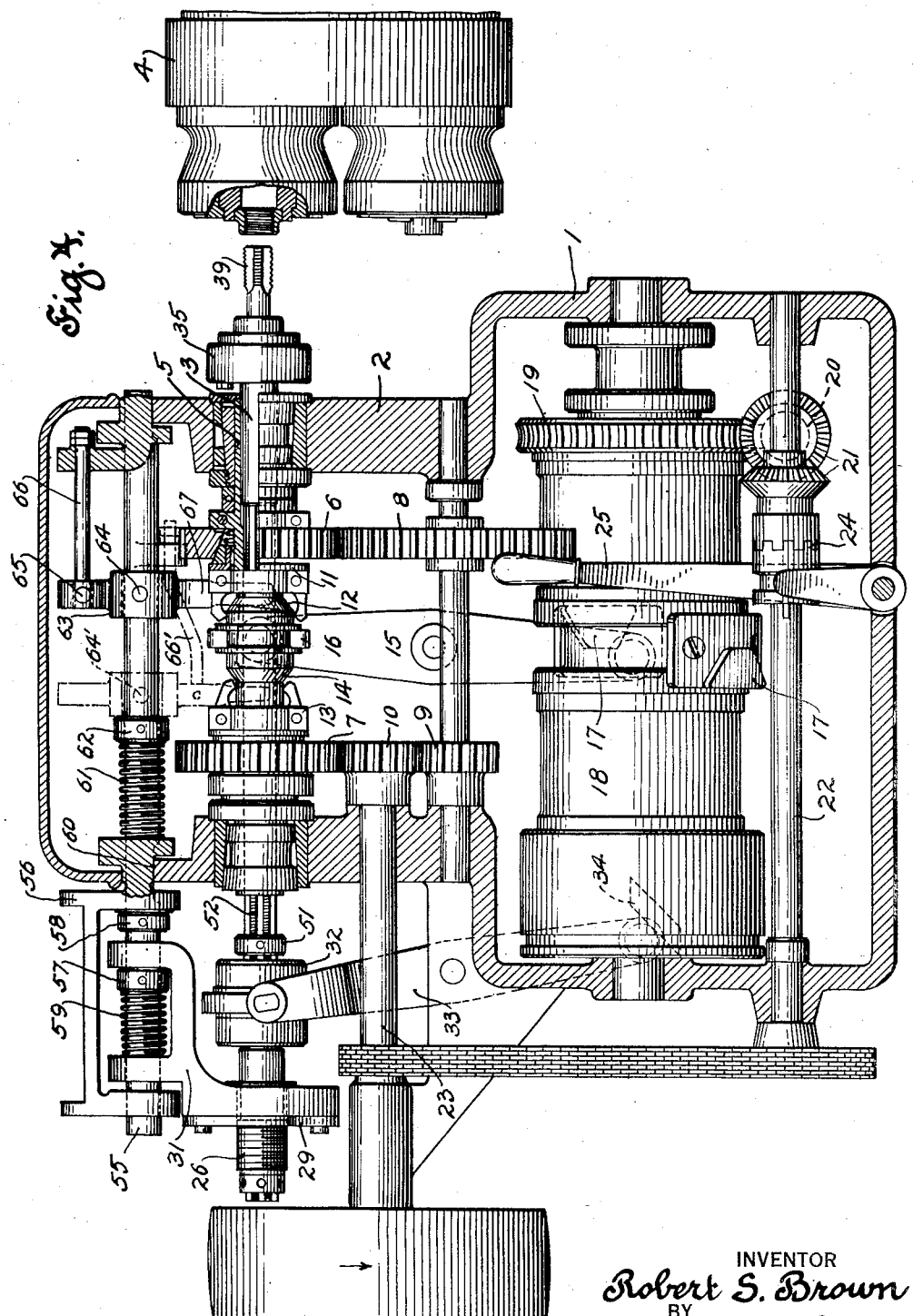

July 7, 1931.　　　　R. S. BROWN　　　　1,813,480
THREADING DEVICE
Filed Sept. 22, 1926　　4 Sheets-Sheet 4

INVENTOR
Robert S. Brown
BY
ATTORNEYS

Patented July 7, 1931

1,813,480

UNITED STATES PATENT OFFICE

ROBERT S. BROWN, OF NEW BRITAIN, CONNECTICUT, ASSIGNOR, BY MESNE ASSIGN-MENTS, TO THE NEW BRITAIN-GRIDLEY MACHINE COMPANY, OF NEW BRITAIN, CONNECTICUT, A CORPORATION OF CONNECTICUT

THREADING DEVICE

Application filed September 22, 1926. Serial No. 137,065.

My invention relates to a threading device particularly adapted for use in a multiple spindle chucking machine. The invention has been illustrated and will be described as applied to a multiple spindle chucking machine of the character disclosed in my copending application, Serial No. 98,974, filed April 1, 1926, wherein the work articles are held on an indexing turret and the tools, including the threading tool, are fed to the work. The invention is applicable to machines differing from that described in my said application.

In threading work pieces, particularly where a thread is to approach very closely a shoulder or the like, or in other cases where the threads on the work piece are to be of definite length, it is most desirable to have means for stopping the threading operation within very close limits. Machines have been used wherein the feed of the threading spindle throws out the clutch mechanism or the like and thus stops further feeding and rotation of the threading spindle. With such machines various difficulties have been experienced, and it is difficult to stop the threading operation within close limits.

It is the principal object of the present invention to provide an improved threading device whereby threads may be accurately cut and in which the length of thread may be predetermined within very close limits.

Among other objects are: To provide an improved form of threading device wherein various functions of a chucking machne, for example, may be stopped, continued, or intermittently operated without affecting the accuracy of the threading operation; to provide improved means for causing elements of a thread leader mechanism to engage with each other; to provide a machine by which right or left hand threads may be cut by the same machine and with only simple changes; to provide a threading device in which the rotation of the threading spindle is stopped after the feed thereof has been arrested; and, in general, to provide a threading device which will be relatively simple in construction, and which is not likely to get out of order, and in which breakage of tools or other parts due to carelessness or lack of skill on the part of the operator is guarded against.

Briefly stated, in the preferred form of the invention I employ a threading spindle which is adapted to be fed to the work article held in a suitable chuck, such as one carried by an indexing turret. The spindle is arranged for rotation in both directions so that a threading tool, such as a tap or die, may be fed into the work piece and, upon reverse rotation of the spindle, the threading tool is retracted from the work piece. I employ a thread leader mechanism, preferably carried by the threading spindle and a bracket, which latter may be spring pressed in one direction, and the screw and nut of the thread leader mechanism are moved into engagement by suitable means such as a cam. Means are provided for stopping the feed of the threading spindle at a predetermined point, and thereafter to cause rotation of the spindle to be discontinued. I may employ means preferably in the form of a special chuck for permitting a slight independent longitudinal movement of the threading tool relatively to the spindle so that after the feed of the threading spindle has been arrested, and while rotation of the latter is still continuing, the threading tool may continue to feed into the work piece.

In the drawings which show, for illustrative purposes only, a preferred form of the invention—

Fig. 1 is a view in elevation of a part of a multiple spindle chucking machine and illustrating features of the invention;

Fig. 2 is a view in end elevation of the machine shown in Fig. 1;

Fig. 3 is a sectional view taken substantially in the plane of the line 3—3 of Fig. 1;

Fig. 4 is a view in partial section of parts illustrating the invention, various elements being shown displaced from their normal positions when assembled in a machine, the better to illustrate the invention;

Figure 6:
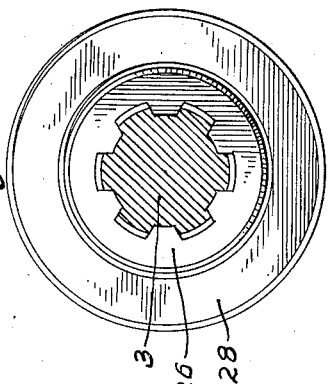
Fig. 6 is a sectional view taken substantially in the plane of the line 6—6 of Fig. 5.

In said drawings, 1 indicates the base or frame of the machine carrying the head stock portion 2 by which is carried the necessary gearing or the like for actuating a plurality of spindles and including the threading spindle 3. In the particular embodiment shown, tool spindles other than the threading spindle have been omitted for the sake of clearly disclosing the invention and for the further reason that multiple spindle machines in general of this type are now known and on the market. The work pieces to be operated on by the various tools and, as herein specifically shown, tools carried by the threading spindle 3 are carried in suitable chucks on the turret 4. This turret, as is common in machines of this type, is indexed at suitable intervals to present new work pieces to the various tools carried by the corresponding tool spindles.

In the form shown, the threading spindle 3 is carried by a clutch spindle sleeve 5 which is journalled in suitable bearings on the main frame. The spindle is splined to the quill 5 so as to cause the spindle to rotate with but be capable of sliding longitudinally of the sleeve. The quill 5 carries a gear 6 and a gear 7 loosely mounted thereon. The gear 6 meshes with the gear 8 carried by a countershaft, which latter also carries a fixed gear 9 meshing with the main driving pinion 10, which latter in turn may mesh directly with the gear 7. Suitable elements of a clutch mechanism 11 may be carried by the quill 5, and the clutch mechanism is actuated by a clutch cone 12. It will be clear that when the clutch cone 12 is moved toward the right, the coacting clutch mechanism 11 will cause the gear 6 to be locked to the quill and will consequently drive the spindle 3 in one direction through the gears 10, 9, 8 and 6. 13 indicates clutch parts corresponding to those previously mentioned, and a second inclined or cone portion 14 serves to actuate the clutch parts 13. When the clutch cone 14 is moved toward the left as viewed in Fig. 4, the gear 7 is clutched to the quill and it will be plain that the spindle 3 will then be rotated in the reverse direction. It will further be clear that due to the proportioning of the gearing, the rotation of the spindle 3 caused by the gear 6 will be slower than that caused by the gear 7. As now proportioned, the gear 6 would normally drive the spindle 3 in the proper direction during the threading operation while the gear 7 would drive the spindle in the reverse direction for retracting the threading tool. The clutch cones, which in the present instance are integral with or rigid with each other, are actuated in a direction to clutch the gears 6 and 7 to the threading spindle 3 by means of a lever carrying the fork 16. The lever 15, pivoted as shown, is moved by a cam or cams 17 carried by a main cam drum 18 rotatably mounted on the frame.

The cam drum 18 may carry a worm-wheel 19 meshing with a worm 20, and through bevel gearing 21 and shaft 22, the cam drum 18 may be chain driven from the main drive shaft 23 which drive shaft, as will be clear from the foregoing, carries the main driving pinion 10 for rotating the threading spindle. It may be here noted that the movement of the cam drum may be arrested at any time by opening the clutch 24 by means of the handle 25.

Figure 5:
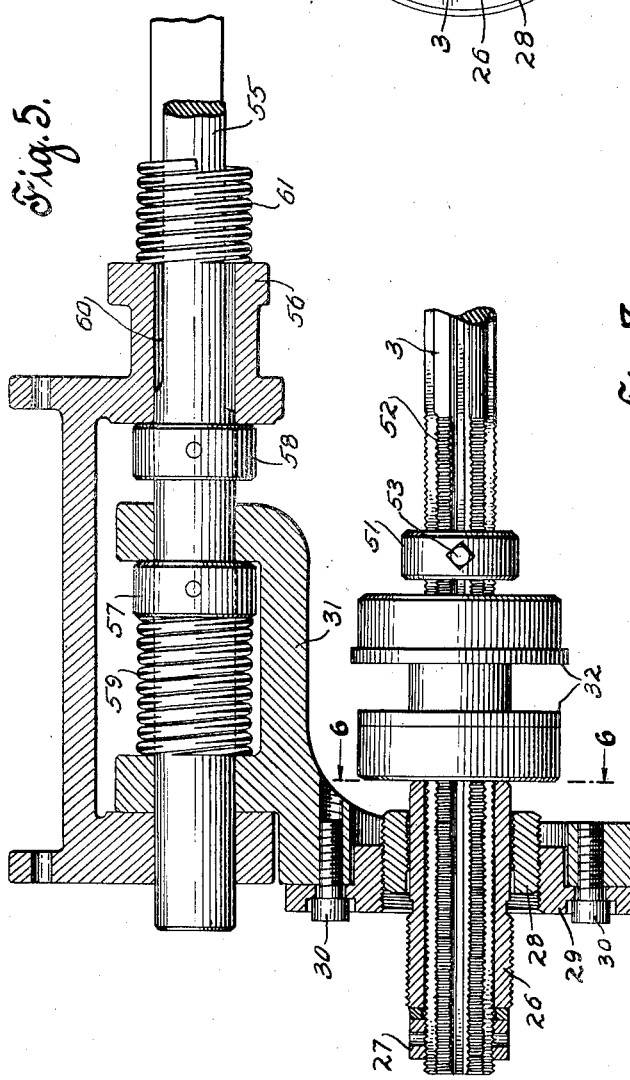
Fig. 5 is an enlarged fragmentary sectional view of details.

The threading spindle 3 is adapted to be fed to the work by suitable thread leading mechanism. In the specific form shown, I employ a lead screw 26 carried by the rear end of the threading spindle 3. This lead screw 26 is preferably made as a separate sleeve readily removable from the threading spindle 3 so that lead screws having threads of different pitch may be employed when it is desired to change the lead of the thread to be cut by the threading device. The lead screw 26 is preferably a relatively close fit on the shaft 3 and may be suitably keyed to the spindle 3 as is more clearly shown in Figs. 5 and 6. The spindle 3 may have a plurality of longitudinal keyways and the lead screw provided with interfitting keys so that rotation of the lead screw on the threading spindle will be prevented. Any suitable locking means, such as a nut 27, may be employed for holding the lead screw 26 in place. A leader nut 28 may be screw threaded and keyed (Fig. 2) to a removable plate 29, which is adapted to be held as by means of the cap screws 30—30 on a floating lead arm bracket or yoke 31. As indicated particularly in Fig. 5, the plate 29 may be adjusted on the bracket 31 so as to insure concentricity of the lead screw and nut and thus avoid a binding or cramping action. Before the threading spindle starts to feed for the threading operation, the leader screw 26 and nut 28 are normally out of mesh with each other. The spindle 3 may carry a spool 32 which, as will be later described, serves to advance the spindle 3 by reason of its connection to a lever 33 which is in turn actuated by a cam 34 on the cam drum 18.

Figure 7:
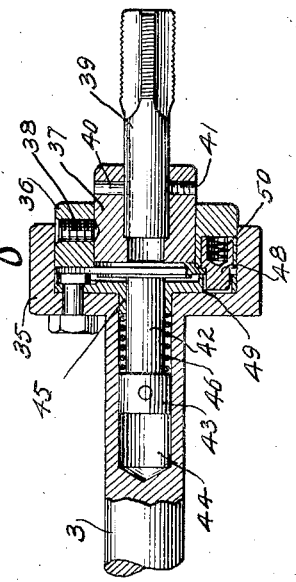
Fig. 7 is an enlarged sectional view of another detail.

The forward end of the threading spindle 3 carries a threading tool in such a manner as to permit limited longitudinal movement of the threading tool relatively to the threading spindle proper. One form of keyed connection to permit such longitudinal movement is shown in Fig. 7 in which the forward end of the spindle 3 is provided with a cuplike portion 35 in which is fitted a collar or sleeve 36. The collar 36 may carry an adapter 37 and these two elements are held together by any suitable means such as a set screw 38. A threading tool such as the tap 39, is held in the adapter 37 by any suitable means, such as a key 40 and set screw 41. The collar 36 is secured to a drawback rod 42, which rod may carry an abutment 43 fitting in a bore 44 in the spindle 3. A second abutment 45 may be secured to the cuplike portion 35 and a spring 46 is interposed between the abutments 43 and 45. The spring 46 constantly urges the drawback rod 42 and with it the associated parts, including the threading tool 39, to retracted position. If, as will be later described, the tool 39 advances while the feed of the threading spindle 3 is arrested, the collar 36 slides in the cuplike portion 35 and the spring 46 is then compressed. As soon as the threading tool 39 is released, the compressed spring 46 retracts the threading tool and parts by which it is carried into the position shown in Fig. 7. In order to permit this relative longitudinal movement between the threading tool and the threading spindle and still prevent relative rotation between those parts, I employ suitable means, such as a key 48, interposed between the collar 36 and an aperture or keyway 49 in the abutment plate 45. A key 48 may be slidable in both the abutment plate 45 and collar 36 and, in the form shown, I employ a spring 50 for urging the key 48 into the keyway 49 and maintaining the same therein during the relative longitudinal movement between the spindle and threading tool. The purpose of permitting this limited longitudinal relative movement will be more fully described in connection with the description of the operation of the threading device. Any simple form of spline or key connection between the tool and spindle would be sufficient for permitting the relative movement mentioned above, but I prefer to employ an arrangement such as shown in Fig. 7 for a reason to appear.

The threading spindle 3 carries a stop member, which in the form shown is the collar 51 (Fig. 5) threaded on the screw threaded portion 52 of the threading spindle 3. The threading spindle, which is provided with a plurality of keyways as previously described, affords a ready means for receiving the set screw 53 for preventing rotation of the collar 51 on the threading spindle. The collar 51, due to its threaded connection with the spindle 3 and means for preventing rotation thereon, may be very accurately adjusted as to its longitudinal position on the spindle 3 and thus may be held within very close limits for determining thread lengths as will be later described.

The floating bracket 31, which carries the lead nut 28, may be slidably mounted upon a guide or shaft 55 which is in turn slidably carried on a supporting frame or base 56. This frame or base 56, together with parts associated therewith as will be described, may be made removable as a unit from the chucking machine and thus permit the threading mechanism to be readily adapted to existing machines. In the form shown, the guide shaft 55 carries collars 57—58 for limiting the extent of movement between the yoke frame 31 and the shaft. Means such as a spring 59 may be interposed between one of the collars and a part of said yoke 31 for constantly urging the latter in one direction, as will be clear from Figs. 4 and 5.

The guide shaft 55 may be non-rotatably held in the frame 56 as by means of a slabbed off portion 60 thereon fitting in a correspondingly shaped aperture through the frame 56. Means such as a spring 61 interposed between a fixed collar 62 and a part of the frame 56 constantly urges the shaft 55 in one direction, namely, toward the right, as viewed in the drawings. Now, as will be hereinafter described, after the feed of the threading spindle has been arrested, the guide shaft 55 will be moved by means of the thread leader mechanism toward the left, as viewed in the drawings. This movement is utilized for stopping further rotation of the threading spindle and with it the thread leader mechanism. In the illustrative form, the guide shaft 55 carries a lever member 63 pivoted thereto at 64. The short end of the lever is pivoted at 65 to a relatively fixed part, such as to a link or bolt 66 secured to the frame 56 or some other stationary part. The long end 67 of the lever 63 extends down so as to be in a position to engage the clutch cone 12 or some part movable therewith for tripping the latter and thus unclutching the gear 6 and consequently stopping further rotation of the threading spindle. The arrangement of the lever 63, shown in full lines in Fig. 4, is such that the clutch 11 is thrown out or tripped upon movement of the shaft 55 toward the left. This full line arrangement is that which would ordinarily be employed for say a right hand threading operation. When it is desired to form a left hand thread, the lever 63 is moved to the dotted line position shown in Fig. 4, and the link or bolt 66' is pivoted at one end to the lever between the fulcrum point 64' on the shaft 55 and the forward or trip end of the lever 63. The opposite end of link 66' is connected to a lug on the frame as shown in dotted lines in Fig. 4. Now, upon movement of the shaft 55 toward the left, the trip end of the lever 64 will be caused to throw out the clutch cone 14 and thus unclutch the threading spindle from the gear 7. As soon as the guide shaft 55 is released, the spring 61 serves to return it to its original and extreme right hand position, for example as shown in Fig. 4.

The operation of the threading device will now be described in connection with cutting a right handed thread. Power is applied to the shaft 23 so as to rotate the same in the direction indicated by the arrow on the main drive pulley. The shaft 23 through the drive chain serves to rotate the shaft 22, and through the bevel gearing and worm gearing previously described (Fig. 4), the cam drum 18 is rotated. Upon rotation of the cam drum, the cam 17, shown in dotted lines in Fig. 4, engages the lever 15 and causes the clutch cone 12 to actuate the clutch part 11 to clutch the gear 6 to the quill and spindle. The shaft 23 and the drive gear 10 carried thereby causes rotation of the gears 9 and 8, and consequently of the gear 6, and the clutch quill and threading spindle now clutched to the gear 6. The threading spindle and threading tool 39 will then be rotating in the proper direction but the threading tool will not yet be in engagement with the work article to be threaded.

During rotation of the cam drum 18, the cam 34 engages the lever 33, and the latter through the spool 32 advances the threading spindle 3 toward the right. During this movement, the threading spindle is permitted to slide in the clutch quill but is caused to rotate therewith through the splined connection. This movement of the threading spindle toward the right causes the lead screw 26 to move up to the lead nut 28 and, if the threads on the lead screw and lead nut happen to come into proper registry, the threading spindle will start to feed through the agency of these thread leader members. During the movement of the threading spindle 3 by the lever 33, the lead screw 26 in abutting the lead nut 28 whether or not these two leader members are in threaded engagement with each other, may cause the yoke 31 to move toward the right and against the compression spring 59. This movement is continued for a sufficient length of time to insure proper threaded engagement between the leader screw and leader nut. After the leader members are engaged with each other, the cam 34 passes the end of the lever 33, and the compression spring 59 then returns the yoke 31 and with it the leader members and threading spindle 3 toward the left as viewed in the drawings. The yoke 31 is then held against further movement toward the left by means of some fixed part on the guide 55, such as the collar 57. Now, since the threading spindle is rotating and the leader screw 26 is in threaded engagement with the nut 28, the threading spindle will be fed toward the right and the threading tool 39 fed toward and into the work article. Obviously, the pitch of the threads on the leader screw and on the threading tool should be the same for the best results. However, if through carelessness the pitch of these threads is not precisely the same, the special form of clutch shown in Fig. 7 may permit the threading tool 39 to feed itself into the work article provided, of course, that the threads on the threading tool are of greater pitch than those on the leader screw 26.

When the stop collar 51, having been previously set at a predetermined point on the threading spindle 3, comes in contact with a fixed part on the frame, further feed of the threading spindle will be stopped, but since rotation of the threading spindle continues, and since the threading spindle can no longer advance, the lead nut 28 is moved toward the left as viewed in the drawings. Now, since the yoke 31 carrying the leader nut has previously taken up this extreme left hand position relative to the guide shaft 55, this left hand movement of the yoke 31, through the agency of the collar 57 or some other part of the frame in engagement with the yoke 31, serves to draw the guide shaft 55 toward the left. This left hand movement of the guide shaft 55 causes the lower end 67 of the trip lever to move the clutch cone 12 away from the clutch jaws and thus unclutches the drive gear 6 from the threading spindle and rotation of the latter then ceases. By properly proportioning the lengths of the lever arms, a relatively slight movement of the guide shaft 55 may be caused to transmit a relatively great movement to the clutch cone 12 and stop rotation of the threading spindle. Now, after the forward feed of the threading spindle by the thread leader members has been arrested, and before the clutch has been thrown out, the rotation of the threading spindle continues, and since the threading tool is in engagement with the work piece, the tool feeds itself into the work piece. The special form of chuck shown in Fig. 7 permits this feed of the threading tool independently of the feed of the threading spindle and consequently no damage to the threading tool or work piece results by a stoppage of feed of the threading spindle while rotation thereof continues. It should be noted in this connection, however, that, due to the lever multiplying mechanism, only a very slight rotation of the threading spindle after the feed thereof has been arrested serves to trip the clutch and stop further rotation of the threading tool. While a simple spline or key connection between the threading tool and spindle may suffice, particularly when the spindle rotation is stopped quickly after the feed is arrested, I prefer to use a tool holder of the type shown in Fig. 7. For slow rotative speeds of the spindle, I may arrange the parts so that the key 48 becomes a simple driving lug or key and the threading tool 39 may then draw the key 48 from its keyway 49 after which continued rotation of the spindle has no further effect on the tool. Quick stopping of spindle rotation is then not important. For high threading speeds, however, I prefer to keep the tool and spindle keyed together and there is then no danger or breaking the key 48. It will be clear that, in the specific form of device herein shown, the resistance encountered in throwing out the clutch 11 has no effect upon the feed of the threading tool, and no adverse action on the threading operation results because the actual feed of the threading spindle has been stopped before the relatively great clutch resistance is encountered. By a proper adjustment of the collar 51 and proper proportioning and positioning of the trip lever 64, the predetermined depth of thread cut may be very accurately determined between very close limits. This is an exceedingly important point when threading some classes of work.

After the rotation of the threading tool has been stopped, the lever 15 is engaged by the cam 17 shown in full lines in Fig. 4, and the clutch cone 14 is then thrown into engagement with the clutch part 13 and the reverse gear 7 reverses the rotation of the threading spindle 3. The threading tool 39 is then withdrawn from the work piece 4 and, upon continued rotation of the threading spindle 3, the guide shaft 55 is caused to return to its extreme right hand position by the spring 61, and the leader screw 26 threads itself out of the leader nut 28, and thus continued reverse rotation of the threading spindle has no further effect upon the feed thereof in either direction.

The turret 4 is then indexed and a new work piece presented to the tool and the same cycle of operations is then repeated, the cam 17 shown in dotted lines in Fig. 4 next serving to disengage the clutch cone 14 and engage the clutch cone 12.

When it is desired to cut a left hand thread on a work piece, a proper left hand tool 39 is secured in the chuck and an appropriate left hand leader screw and leader nut are set in place. The lever 63 is moved to the position shown in dot and dash lines in Fig. 4 and the link 66' is employed. Now, when the full line cam 17 engages the lever 15, the gear 7 will be clutched to the threading spindle 3 and the proper direction of rotation for a left hand thread will follow. The same series of events will then take place as previously described for a right handed thread and, as soon as the proper thread depth has been attained, the lever 63 will throw out the clutch cone 14 and stop further rotation of the threading tool. The dotted line cam 17 next engages the lever 15 and serves to clutch the gearing 6 to the threading spindle, which gear now becomes the reverse gear for a left hand threading operation. The tool is threaded out of the work piece and the parts again assume their original positions as previously described.

A number of important advantages flow from the present invention: The length of thread to be cut may be very accurately determined between very small limits and is not dependent upon a time relationship between other functions of the machine but is only dependent upon the length of thread to be cut.

The clutch mechanism driving the threading spindle is tripped upon a much smaller movement than would be required were the clutch directly tripped by the forward feed of the threading spindle.

The independent axial movement of the threading tool and threading spindle prevents damage or breakage of tools or work articles.

The location of the threading spindle inside the clutch quill spindle simplifies the device and provides for adequate bearings.

The floating bracket and compression spring carrying one of the thread leader members permits of a ready and nice engagement of the thread leader members.

The resistance of the clutch to moving; that is, to being unclutched does not have any tendency to affect the lead of the thread since the feed of the threading spindle has been stopped before the clutch is tripped.

Changing from a right hand to a left hand threading operation is very simply done by merely shifting a lever and providing appropriate tools and leader mechanism.

By positioning parts of the thread leader mechanism and trip lever mechanism upon a separate frame, all of these elements carried by the frame may be handled as a unit and may be readily applied to existing machines.

The operation of the cam drum may be arrested and all indexing and other operations stopped without in any way adversely affecting the threading operation.

While the invention has been described in great detail and as applied to a particular form of machine, I do not wish to be strictly limited to the structural elements herein disclosed nor to the application of the invention to the particular machine shown since changes may be made within the scope of the invention as defined in the appended claims.

I claim:

1. In a threading device, a threading spindle, means for rotating the same in forward and reverse directions, clutch mechanism for controlling the direction of rotation of said spindle, a leader screw on said spindle, a frame carrying a leader nut for receiving said leader screw, means for advancing said leader screw and leader nut to each other while said threading spindle is rotating in one direction, resilient means for permitting said leader screw and leader nut to move together until they are properly engaged, stop means for limiting the feed of said threading spindle by said leader members, said means including said frame for automatically tripping said clutch mechanism after said stop means has stopped the feed of said spindle.

2. In the combination defined in claim 1, said means for tripping said clutch mechanism including a lever arm for multiplying the movement of said frame whereby said clutch mechanism is tripped upon a relatively small movement of said frame.

3. In the combination defined in claim 1, and means for causing said clutch mechanism to be engaged for reversing the direction of rotation of said spindle and causing said spindle to be retracted.

4. In a threading device, a threading spindle, means for rotating said spindle in forward and reverse directions, means for controlling the rotation of said spindle, cam means for actuating said last mentioned means in one direction, thread leader mechanism for advancing said threading spindle, cam means for causing the engagement of parts of said thread leader mechanism, resilient means for causing the parts of said thread leader mechanism to move simultaneously until after they are engaged with each other, means for arresting the feed of said threading spindle, and means actuated by said thread leader mechanism after the feed of said threading spindle has been arrested for disengaging said means for causing said threading spindle to rotate in one direction.

5. In a threading device, a threading spindle, means for rotating said spindle in forward and reverse directions, clutch mechanism for controlling the direction of rotation of said threading spindle, said spindle having a leader thread, a movable bracket means carrying a leader nut for engagement with said leader thread, said bracket means being normally stationary during the feed of said threading spindle by said leader thread, means for arresting the feed of said threading spindle, said movable bracket being movable by said leader thread after the feed of said threading spindle has been arrested, and means actuated by said movable bracket means for disengaging said clutch and stopping rotation of said threading spindle after the feed of the latter has been arrested.

6. In the combination defined in claim 5, said means actuated by said bracket means including a lever pivotally mounted thereon and held substantially stationary at one part whereby another part is movable so as to engage said clutch.

7. In a threading device, a threading spindle, means for rotating the same, clutch mechanism for controlling the rotation of said spindle, a thread leader screw member, a coacting thread leader nut member, one of said members being carried by said threading spindle, a spring pressed floating bracket carrying the other of said thread leader members, means for limiting the feed of said threading spindle by said thread leader members, and means actuated through said floating bracket for tripping said clutch mechanism after the feed of said threading spindle has been stopped.

8. In the combination defined in claim 7, and tool carrying means actuated by said threading spindle, said tool carrying means having means for permitting a limited longitudinal movement of a tool carried by said tool carrying means relatively to said threading spindle.

9. In a threading device, a threading spindle, means for rotating the same, clutch mechanism for controlling the rotation of said spindle, a leader screw on said spindle, a leader nut for coaction with said leader screw, a floating bracket carrying said leader nut, a stop member adjustably held on said threading spindle for stopping the feed of said spindle by said leader screw and nut, and means actuated by said leader screw and nut for tripping said clutch mechanism and stopping rotation of said spindle after the feed of said spindle has been stopped.

10. In a threading device, a threading spindle, means for rotating the same, means for controlling the rotation of said spindle, thread leader means for feeding said spindle in one direction, stop means for arresting the feed of said threading spindle, means carried by said threading spindle and having means for permitting a tool carried by said threading spindle to feed independently of said threading spindle after the feed of said threading spindle has been arrested, and means for stopping the rotation of said spindle after the feed thereof has been arrested.

11. In a threading device, a threading spindle, means for rotating the same, clutch means for controlling the rotation of said spindle, a leader screw carried by said threading spindle, a leader nut for coaction with said leader screw, a floating bracket carrying said leader nut, a guide member carrying said bracket, said floating bracket having limited movement on said guide member, and a lever pivotally mounted on said guide member, one part of said lever being pivoted to a fixed part, another part of said lever engaging said clutch mechanism for tripping the same, stop means for stopping the feed of said threading spindle by said thread lead screw and nut, said bracket carrying said nut being moved by said thread lead screw after the feed of said spindle has been stopped, said bracket in moving carrying said guide member and actuating said lever to trip said clutch mechanism.

12. In the combination defined in claim 11, and yielding means for returning said lever to normal position.

13. In a threading device, a threading spindle, means for rotating the same, clutch means for controlling the rotation of said spindle, said spindle having a threaded portion, a stop collar screw threadedly engaged over said threaded portion for stopping the feed of said spindle, means for holding said collar against rotation on said threaded portion, a thread leader screw carried by said threading spindle, a coacting thread leader nut, and means actuated by said thread leader screw and nut for tripping said clutch mechanism after the feed of said spindle has been stopped by said stop collar.

14. In a threading device, a threading spindle, means for rotating the same, a clutch quill about said threading spindle, a clutch cone, thread leader mechanism for feeding said spindle, stop means for arresting the feed of said spindle, and means actuated by said thread leader mechanism for moving said clutch cone to trip said clutch mechanism after the feed of said threading spindle has been arrested.

15. In a threading device, a threading spindle, means for rotating said spindle, thread leader mechanism for feeding said spindle, means for arresting the feed of said spindle by said thread leader means, means permitting a threading tool carried by said spindle to continue to advance after the feed of said threading spindle has been arrested, and means for stopping the rotation of said threading spindle soon after the feed thereof has been arrested.

16. In a threading device, a threading spindle, means for rotating the same in forward and reverse directions, thread leader mechanism for feeding said spindle, a chuck carried by the forward end of said spindle, means for arresting the feed of said threading spindle while permitting the continued rotation thereof, said chuck having means for permitting a tool carried thereby to continue to feed after the feed of said threading spindle has been arrested, and means for stopping the rotation of said threading spindle after the feed thereof has been arrested.

17. In a threading device, a threading spindle, means for rotating the same in forward and reverse directions, clutch mechanism for controlling the direction of rotation of said threading spindle, thread leader means for feeding said threading spindle forward during the rotation of said spindle in one direction, stop means for limiting the forward movement of said threading spindle, and means including said thread leading mechanism for disengaging said clutch and thus stopping the rotation of said threading spindle, said means including a relatively long lever arm for disengaging said clutch quickly after the feed of said threading spindle has been arrested.

18. In a threading device, a threading spindle, means for rotating the same in forward and reverse directions, clutch mechanism for controlling the direction of rotation of said threading spindle, thread leading means for feeding said spindle, stop means for stopping the feed of said threading spindle, and means actuated by said thread leading means for disengaging said clutch means shortly after the feed of said threading spindle has been stopped.

19. In a threading device, a threading spindle, means for rotating said spindle in forward and reverse directions, said spindle having one member of a thread leading device for feeding said spindle, bracket means carrying a coacting thread leading device, stop means for limiting the feed of said spindle in one direction, and means controlled by said bracket means for stopping the rotation of said threading spindle shortly after the feed of said threading spindle has been stopped.

20. In the combination defined in claim 19, said means for stopping the rotation of said threading spindle including a lever actuated by said bracket means.

21. In a threading device, a threading spindle, means for rotating said spindle in forward and reverse directions, clutch mechanism for controlling the direction of rotation of said spindle, said spindle having a leader thread thereon, a bracket carrying a leader nut for coaction with said leader thread, means for advancing said leader thread and leader nut to each other, resilient means for permitting simultaneous movement of said leader thread and leader nut until after said leader thread and leader nut have definitely engaged with each other, stop means for arresting the feed of said spindle by said leader thread and leader nut, and means movable by said leader nut upon a continued rotation of said spindle after the feed of the latter has been arrested for disengaging said clutch and stopping the rotation of said spindle.

22. In the combination defined in claim 21, said means for disengaging said clutch including a multiplying lever actuated by said bracket means aforesaid.

23. In a threading device, a threading spindle, means for rotating the same in forward and reverse directions, thread leader mechanism for feeding said spindle, abutting stop means for arresting the feed of said spindle and preventing further feed thereof while permitting continued rotation thereof, and threading tool holding means on the forward end of said spindle, said tool holding means permitting relative longitudinal movement of a tool relatively to said threading spindle, and means for stopping the rotation of said spindle after arresting the feed thereof.

24. In a threading device, a threading spindle, means for rotating the same, thread leader mechanism for feeding said spindle, abutting stop means for arresting the feed of said spindle while permitting continued rotation thereof, a threading tool carried by said spindle, and a key connection between said threading tool and spindle for permitting a relative longitudinal movement between said spindle and threading tool, and means for stopping the rotation of said spindle after arresting the feed thereof.

25. In a threading device, a threading spindle, means for rotating the same, thread leader mechanism for feeding said spindle, abutting stop means for arresting the feed of said spindle and preventing further feed thereof and permitting continued rotation thereof, and connecting means between said spindle and a threading tool for permitting feeding of the threading tool independently of the feed of said threading spindle, and means for stopping the rotation of said spindle after arresting the feed thereof.

26. In a device of the character indicated, a base frame member to be secured to a metal working machine, a rotatable spindle, a guide shaft member slidably mounted on said base frame member, a spring for urging said guide shaft member in one direction on said frame, a floating bracket carried by said guide shaft member, a spring for urging said floating bracket in one direction on said guide shaft member, a thread leader member carried by said floating bracket, a coacting thread leader member carried by said spindle to cause the latter to be fed by said leader members, and trip means carried by said guide shaft member for the purpose described.

27. In the combination defined in claim 26, said trip means comprising a lever pivotally mounted on said guide shaft member.

28. In a device of the character indicated, a spindle, a leader thread member therefor, a base frame member carrying a movable bracket means, resilient means for urging said bracket means in one direction, a second resilient means for urging a part of said bracket means in one direction relatively to another part thereof, a lever actuated by said bracket means, a part of said bracket means embodying a leader thread member coacting with said spindle leader member for feeding said spindle, and a clutch device actuated by said lever for the purpose described.

29. In the combination defined in claim 28, said base frame member and associated parts being of unitary construction whereby all said parts may be handled as a unit.

30. In a threading device, a threading spindle, means for rotating the same, thread leader mechanism for feeding said spindle, clutch means for controlling the rotation of said spindle, a multiplying lever for directly actuating said clutch mechanism, means directly connecting said lever to part of said thread leader mechanism whereby the latter may move said clutch mechanism a greater distance than said thread leader mechanism part is moved.

31. In a threading mechanism, a threading spindle, means for rotating the same in forward and reverse directions, cam means for initiating a feeding movement of said spindle, thread leader mechanism for thereafter feeding said spindle, and means actuated by said thread leader mechanism and said rotating spindle for stopping rotation of the latter.

32. In a threading mechanism, a threading spindle, means for rotating the same in forward and reverse directions, cam means for initiating a feeding movement of said spindle thread leader mechanism for thereafter feeding said spindle, means actuated by said rotating spindle and said thread leader mechanism for stopping rotation of said spindle in one direction, and cam means for actuating said means to rotate said spindle in the opposite direction.

33. In a device of the character indicated, a spindle, means for rotating the same, a first thread leader member carried by said spindle, a second coacting thread leader member, a support for the second leader member, means for temporarily holding said second leader member against axial movement whereby said spindle and first leader member will be fed axially, and means for thereafter holding said first leader member against axial movement whereby said second leader member will be fed axially, and means actuated by movement of said second leader member for controlling said means for rotating said spindle.

34. In a threading device, a spindle, means for rotating the same, a first thread leader member, a second thread leader member coacting therewith, one of said leader members being movable by said spindle, means for temporarily holding said second leader member against movement while permitting movement of the first leader member whereby said spindle will be fed by said leader members, means for thereafter holding said first leader member against movement while permitting movement of said second leader member, and means actuated by the movement of one of said thread leader members for controlling the means for rotating said spindle.

ROBERT S. BROWN.